(12) United States Patent
Matczynski et al.

(10) Patent No.: US 9,442,766 B2
(45) Date of Patent: Sep. 13, 2016

(54) MANAGING CLOUD RESOURCE LIFECYCLES IN A MULTI-CLOUD COMPUTING ENVIRONMENT

(75) Inventors: Michael J. Matczynski, Waltham, MA (US); Seshubabu Pasam, Westford, MA (US); Zhiyuan Zhang, Woburn, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 615 days.

(21) Appl. No.: 13/355,782

(22) Filed: Jan. 23, 2012

(65) Prior Publication Data
US 2013/0191542 A1   Jul. 25, 2013

(51) Int. Cl.
*G06F 15/173* (2006.01)
*G06F 9/50* (2006.01)

(52) U.S. Cl.
CPC .......... *G06F 9/5022* (2013.01); *G06F 9/5072* (2013.01)

(58) Field of Classification Search
None
See application file for complete search history.

(56) References Cited

U.S. PATENT DOCUMENTS

| | | | |
|---|---|---|---|
| 8,209,288 B2 * | 6/2012 | Friedman et al. | 707/638 |
| 8,620,870 B2 * | 12/2013 | Dwarampudi et al. | 707/665 |
| 2011/0258634 A1 * | 10/2011 | Bonilla et al. | 718/105 |

* cited by examiner

*Primary Examiner* — Jeffrey R Swearingen

(57) ABSTRACT

A device receives information associated with a resource provided by a cloud computing environment to the device, where the resource is eligible to be reaped. The device determines whether a representation of the resource is referenced in a data structure associated with the device, and initiates a delay timer when a representation of the resource is not referenced in the data structure. When the delay timer has expired, the device stops the resource and one or more resources dependent on the resource and provided by the cloud computing environment, and deletes, from the data structure, representations of the one or more resources dependent on the resource.

20 Claims, 9 Drawing Sheets

FIG. 6

| Object | Dependency | |
|---|---|---|
| CloudNode N1 | No dependencies | ⎫ CLOUD RESOURCE REPRESENTATIONS (500) |
| CloudNode N2 | No dependencies | ⎭ |
| DataTransfer DT1 | N1 | ⎫ CLOUD SERVICE REPRESENTATIONS (510) |
| CloudTunnel CT1 | N1 and N2 | ⎭ |
| Server S1 | DT1 and CT1 | ⎫ USER OBJECT REPRESENTATIONS (520) |
| *** | *** | ⎭ |

610 — Object
620 — Dependency
630 — CloudNode N1
640 — CloudNode N2
650 — DataTransfer DT1
660 — CloudTunnel CT1
670 — Server S1
600

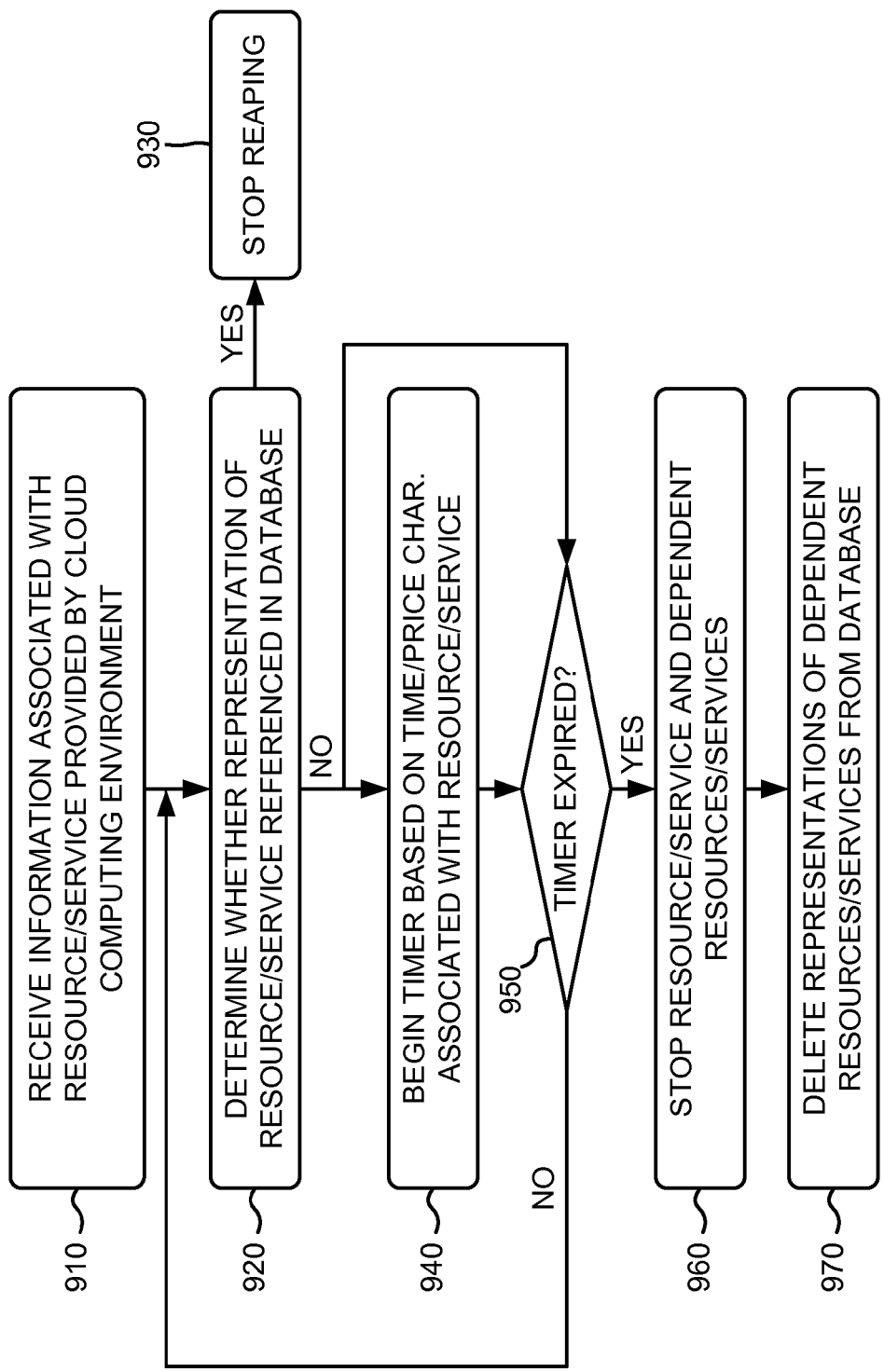

MANAGING CLOUD RESOURCE LIFECYCLES IN A MULTI-CLOUD COMPUTING ENVIRONMENT

BACKGROUND

Cloud computing is the delivery of computing as a service rather than as a product, whereby shared resources, software, and information are provided to client devices (e.g., computers, smart phones, etc.) as a utility over a network, such as the Internet. Cloud computing environments provide computation, software, data access, and/or storage services that do not require end-user knowledge of a physical location and configuration of a system that delivers the services.

A data center is a facility used to house computer systems and associated components, such as telecommunication systems and storage systems. A data center generally includes redundant or backup power supplies, redundant data communications connections, environmental controls (e.g., air conditioning, fire suppression, etc.), and/or security devices. In one example, a data center may share information with a cloud computing environment that may be utilized by client devices.

In a multi-cloud computing environment, the data center device or client device may utilize a variety of cloud resources and/or services provided by different cloud computing environments. Ideally, the data center device/client device attempts to use one-hundred percent of the cloud resources/services since the data center device/client device typically pays for the cloud resources/services for a particular time period. However, when the cloud resources/services are unused and/or underutilized by the data center device/client device, the data center device/client device still incurs costs for the unused and/or underutilized cloud resources/services.

BRIEF DESCRIPTION OF THE DRAWINGS

FIG. 6 is a diagram of a portion of an example database capable of being provided in and/or managed by the data center device;

FIG. 9 is a flow chart of an example process for managing cloud resource lifecycles in a multi-cloud computing environment according to an implementation described herein.

DETAILED DESCRIPTION OF PREFERRED EMBODIMENTS

The following detailed description refers to the accompanying drawings. The same reference numbers in different drawings may identify the same or similar elements.

Systems and/or methods described herein may enable a data center device or a client device to manage cloud resource lifecycles in a multi-cloud computing environment. In one example implementation, the data center device may utilize a software appliance to stop unused and/or underutilized cloud resources (e.g., a compute instance), cloud services (e.g., a virtual tunnel), and/or cloud user objects (e.g., virtual machines). Such an arrangement may enable the data center device from incurring unnecessary costs associated with unused and/or underutilized cloud resources, services, and/or user objects. While keeping costs to a minimum, the data center device may also keep cloud resources, services, and/or user objects available whenever possible.

As used herein, the term "user" is intended to be broadly interpreted to include a client device, or a user of a client device.

In one example implementation, the terms "resource" or "cloud resource," as used herein, is intended to be broadly construed to include a resource, a service, and/or a user object provided by a cloud computing environment.

The term "component," as used herein, is intended to be broadly construed to include hardware (e.g., a processor, a microprocessor, an application-specific integrated circuit (ASIC), a field-programmable gate array (FPGA), a chip, a memory device (e.g., a read only memory (ROM), a random access memory (RAM), etc.), etc.) or a combination of hardware and software (e.g., a processor, microprocessor, ASIC, etc. executing software contained in a memory device).

Figure 1:
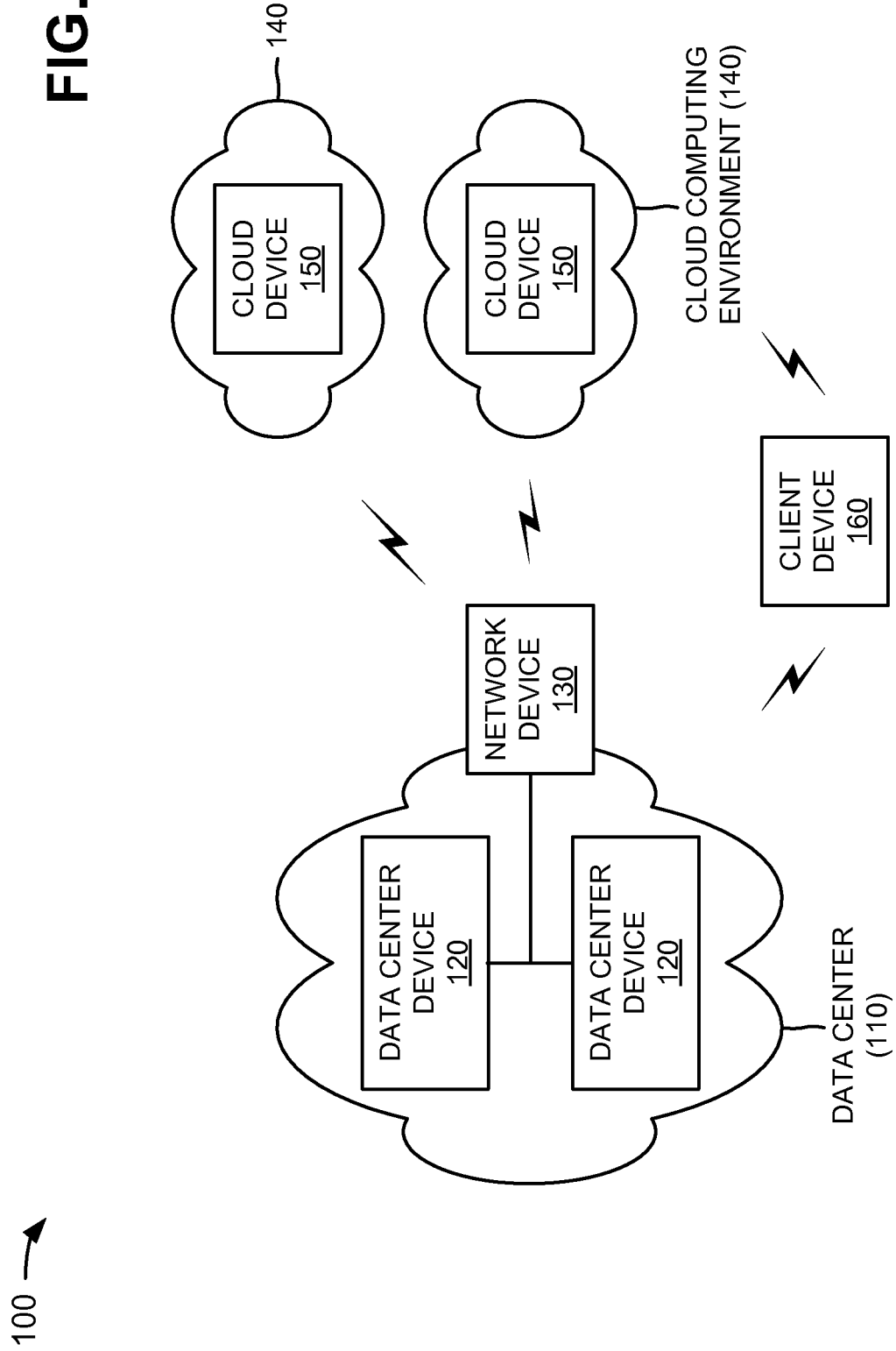
FIG. 1 is a diagram of an example network in which systems and/or methods described herein may be implemented.

FIG. 1 is a diagram of an example network 100 in which systems and/or methods described herein may be implemented. As illustrated, network 100 may include a data center 110 that includes data center devices 120 and a network device 130; cloud computing environments 140 that include cloud devices 150; and a client device 160. Devices and/or networks of network 100 may interconnect via wired and/or wireless connections. One data center 110, two data center devices 120, one network device 130, two cloud computing environments 140, two cloud devices 150, and one client device 160 have been illustrated in FIG. 1 for simplicity. In practice, there may be more data centers 110, data center devices 120, network devices 130, cloud computing environments 140, cloud devices 150, and/or client devices 160.

Data center 110 may include one or more facilities and/or one or more networks with computer systems, server devices, and associated components, such as telecommunications and storage systems. Data center 110 may include redundant or backup power supplies, redundant data communications connections, environmental controls, security devices, etc. In one example, data center 110 may share information, with cloud computing environment 140, which may be utilized by client device 160. Data center 110 may include resources, such as a device (e.g., a network device, a server, a computer system, etc.), data (e.g., availability information, license information, etc.), a service (e.g., a load balancing service, network information collection, etc.), etc.

Data center device 120 may include one or more server devices, or other types of computation and communication devices, that gather, process, search, and/or provide information in a manner described herein. In one example implementation, data center device 120 may receive shared resources, services, user objects, etc. from cloud computing environments 140 and/or cloud devices 150.

Network device 130 may include a gateway, a router, a switch, a firewall, a network interface card (NIC), a hub, a bridge, a proxy server, a multiplexer, or some other type of device that processes and/or transfers traffic. In one example implementation, network device 130 may include a firewall that creates encrypted tunnels with cloud devices 150 so that secure data paths may be provided between data center devices 120 and cloud devices 150.

Cloud computing environment 140 may include an environment that delivers computing as a service, whereby shared resources, services, user objects, etc. may be provided to data center device 120 and/or client device 160 as a utility over a network. Cloud computing environment 140 may provide computation, software, data access, and/or storage services that do not require end-user (e.g., data center device 120 and/or client device 160) knowledge of a physical location and configuration of system(s) and/or device(s) that deliver the services. In one implementation, cloud computing environment 140 may include a data center similar to data center 110.

Cloud device 150 may include one or more server devices, or other types of computation and communication devices, that gather, process, search, and/or provide information in a manner described herein. In one example implementation, cloud device 150 may provide cloud resources, cloud services, cloud user objects, etc. to data center device 120 and/or client device 160 as a utility over a network.

The cloud resources may include a compute instance executing in cloud device 150, a storage device provided in cloud device 150, a data transfer operation executed by cloud device 150, etc. The cloud services may include a virtual machine executing in cloud device 150, a virtual tunnel provided between network device 130 and cloud device 150, etc. The cloud user objects may include a server (e.g., a virtual machine of cloud device 150) that is managed by data center device 120. In one example, the data transfer operation may depend on compute instances, cloud storage resources, and/or servers; the virtual tunnel may depend on one or more compute instances being active; and the server may depend on virtual tunnels and/or compute instances.

Client device 160 may include a radiotelephone; a personal communications system (PCS) terminal that may combine, for example, a cellular radiotelephone with data processing and data communications capabilities; a smart phone; a personal digital assistant (PDA) that can include a radiotelephone, a pager, Internet/intranet access, etc.; a laptop computer; a tablet computer; a desktop computer; a workstation computer; or other types of computation and communication devices.

Although FIG. 1 shows example devices/networks of network 100, in other implementations, network 100 may include fewer devices/networks, different devices/networks, differently arranged devices/networks, or additional devices/networks than depicted in FIG. 1. Alternatively, or additionally, one or more devices/networks of network 100 may perform one or more tasks described as being performed by one or more other devices/networks of network 100.

Figure 2:
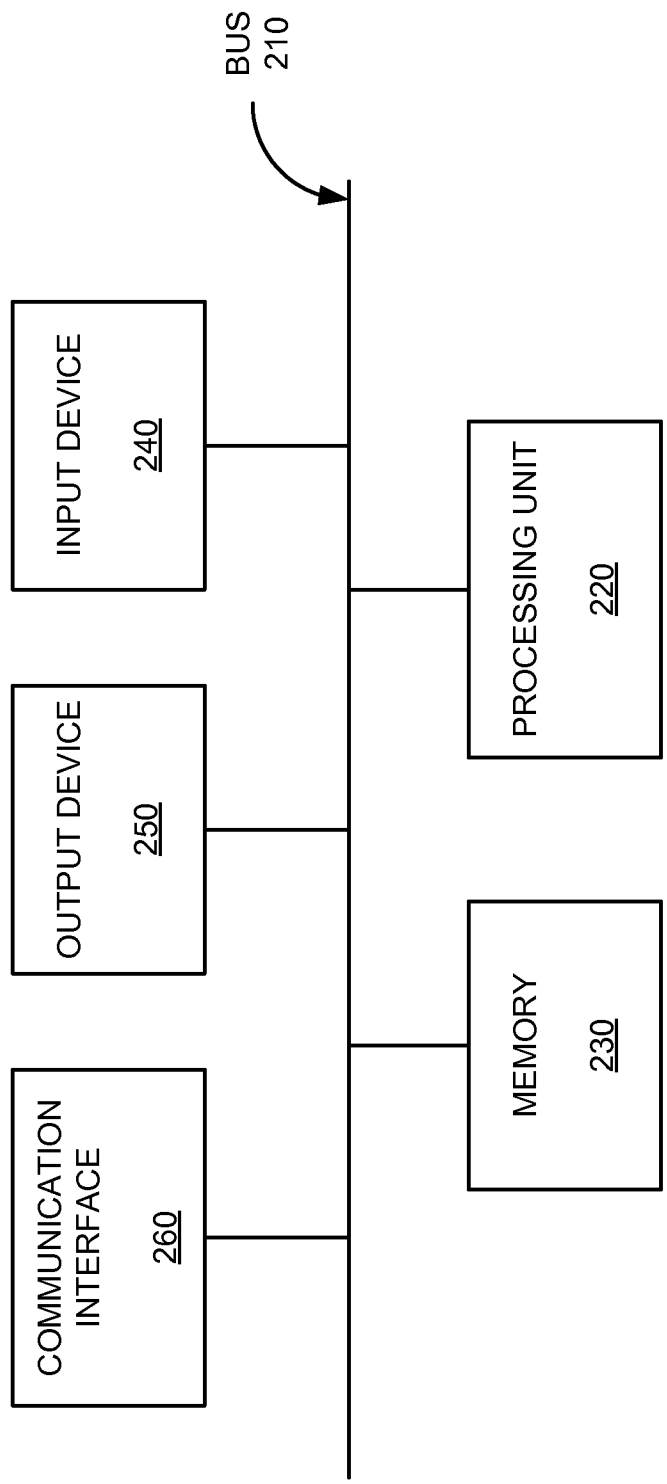
FIG. 2 is a diagram of example components of a device that may correspond to one of the devices of the network depicted in FIG. 1.

FIG. 2 is a diagram of example components of a device 200 that may correspond to one or more devices of network 100 (FIG. 1). In one example implementation, one or more of the devices of network 100 may include one or more devices 200 or one or more components of device 200. As illustrated in FIG. 2, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more ASICs, FPGAs, or the like.

Memory 230 may include a RAM or another type of dynamic storage device that stores information and instructions for execution by processing unit 220, a ROM or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, a touch screen display, one or more biometric mechanisms, and the like. Output device 250 may include a device that outputs information to the operator, such as a display, a speaker, etc.

Communication interface 260 may include any transceiver-like mechanism that enables device 200 to communicate with other devices and/or systems. For example, communication interface 260 may include mechanisms for communicating with other devices, such as other devices of network 100.

As described herein, device 200 may perform certain operations in response to processing unit 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, or additionally, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may include fewer components, different components, differently arranged components, or additional components than depicted in FIG. 2. Alternatively, or additionally, one or more components of device 200 may perform one or more tasks described as being performed by one or more other components of device 200.

Figure 3:
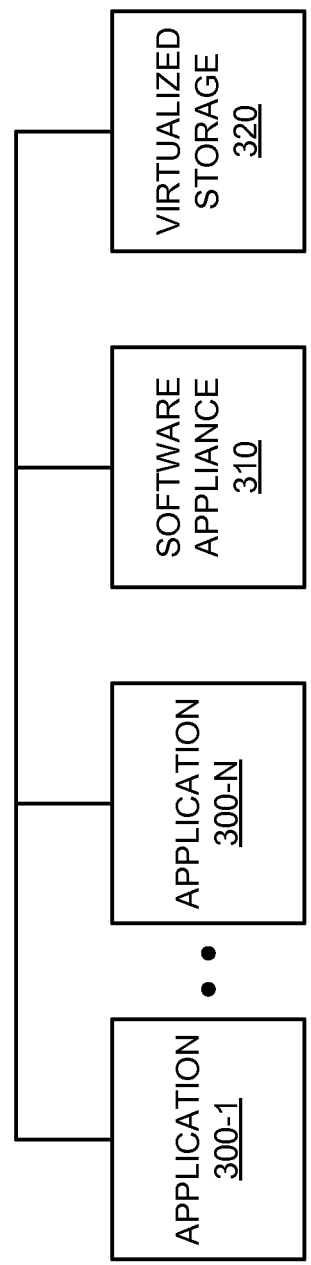
FIG. 3 is a diagram of example functional components of a data center device of FIG. 1.

FIG. 3 is a diagram of example functional components of data center device 120. In one implementation, the functions described in connection with FIG. 3 may be performed by one or more components of device 200 (FIG. 2) or by one or more devices 200. As shown in FIG. 3, data center device 120 may include multiple applications 300-1 through 300-N (collectively referred to herein as "applications 300," and, in some instances, singularly as "application 300"), a software appliance 310, and virtualized storage 320.

Applications 300 may include one or more software applications, available at data center device 120, that are dependent upon the function of data center device 120. For example, applications 300 may include software that handles core business and operational data of an organization, enterprise software, telecommunications software, etc. Applications 300 may be designed for execution by multiple host devices, where each host device may execute a single component. In one example, components of applications 300 may include databases, file servers, application servers, middleware, etc.

Software appliance 310 may securely bridge data center device 120 with cloud computing services provided by cloud computing environment 140. Software appliance 310 may extend data center 110 security and control into cloud computing environment 140 so that applications 300 may remain integrated with data center 110 tools and policies and may be managed as if applications 300 were executing locally. Software appliance 310 may move applications 300 between data center 110 and cloud computing environment 140 based on requirements of an organization. In one example, software appliance 310 may include management components for discovering applications 300, orchestrating cloud deployments, and/or managing cloud utilization. Software appliance 310 may create a secure data path to bridge network connectivity between data center 110 and a chosen provider of cloud computing environment 140. In one example implementation, data center device 120 may utilize multiple software appliances 310 for availability and scaling purposes.

Virtualized storage 320 may include one or more storage systems and/or one or more devices that use virtualization techniques to enable better functionality and more advanced features within the storage systems and/or the devices of data center device 120. In one example, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system greater flexibility in how they manage storage for end users. File virtualization may eliminate dependencies between data accessed at a file level and a location where files are physically stored. This may enable optimization of storage use, server consolidation, and/or performance of non-disruptive file migrations.

Although FIG. 3 shows example functional components of data center device 120, in other implementations, data center device 120 may include fewer functional components, different functional components, differently arranged functional components, or additional functional components than depicted in FIG. 3. Additionally, or alternatively, one or more functional components of data center device 120 may perform one or more tasks described as being performed by one or more other functional components of data center device 120.

Figure 4:
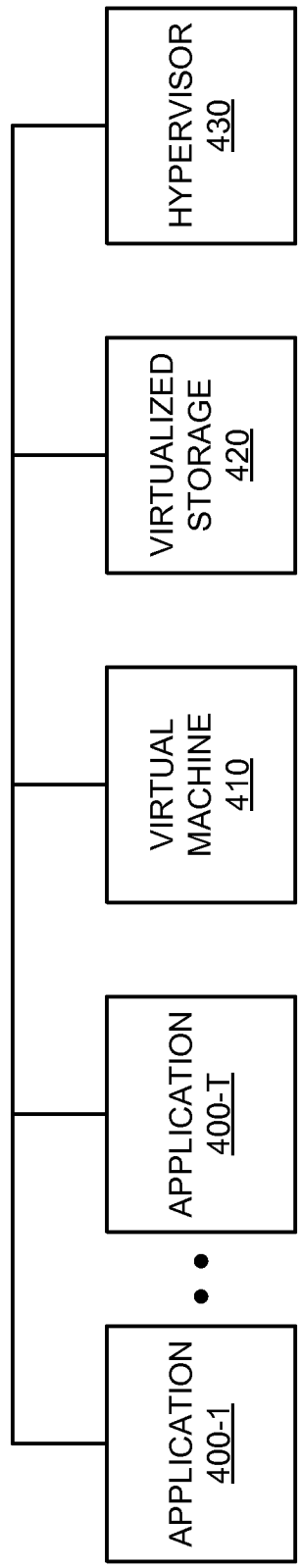
FIG. 4 is a diagram of example functional components of a cloud device of FIG. 1.

FIG. 4 is a diagram of example functional components of cloud device 150. In one implementation, the functions described in connection with FIG. 4 may be performed by one or more components of device 200 (FIG. 2) or by one or more devices 200. As shown in FIG. 4, cloud device 150 may include multiple applications 400-1 through 400-T (collectively referred to herein as "applications 400," and, in some instances, singularly as "application 400"), a virtual machine 410, virtualized storage 420, and a hypervisor 430.

Applications 400 may include one or more software applications that may be provided to or accessed by client device 160. Applications 400 may eliminate a need to install and execute the software applications on client device 160. For example, applications 400 may include word processing software, database software, content, monitoring software, financial software, communication software, and/or any other software capable of being provided via cloud computing environment 140.

Virtual machine (VM) 410 may include a software implementation of a machine (e.g., a computer) that executes programs like a physical machine. Virtual machine 410 may be either a system virtual machine or a process virtual machine, depending upon use and degree of correspondence to any real machine by virtual machine 410. A system virtual machine may provide a complete system platform that supports execution of a complete operating system (OS). A process virtual machine may execute a single program, and may support a single process. In one example implementation, virtual machine 410 may execute on behalf of a data center 110 user (e.g., client device 160), and may manage infrastructure of cloud computing environment 140, such as data management, synchronization, and long-duration data transfers. Virtual machine 410 may provide encryption services for network and storage utilization to ensure that cloud computing environment providers do not have access to data center 110 network or storage communications.

Virtualized storage 420 may include one or more storage systems and/or one or more devices that use virtualization techniques to enable better functionality and more advanced features within the storage systems or devices of cloud device 150. In one example, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system greater flexibility in how they manage storage for end users. File virtualization may eliminate dependencies between data accessed at a file level and a location where files are physically stored. This may enable optimization of storage use, server consolidation, and/or performance of non-disruptive file migrations.

Hypervisor 430 may provide hardware virtualization techniques that allow multiple operating systems (e.g., "guest operating systems") to execute concurrently on a host computer. Hypervisor 430 may present to the guest operating systems a virtual operating platform, and may manage the execution of the guest operating systems. Multiple instances of a variety of operating systems may share virtualized hardware resources. Hypervisor 430 may provide an interface to infrastructure as a service (IaaS) provided by cloud computing environment 140.

Although FIG. 4 shows example functional components of cloud device 150, in other implementations, cloud device 150 may include fewer functional components, different functional components, differently arranged functional components, or additional functional components than depicted in FIG. 4. Additionally, or alternatively, one or more functional components of cloud device 150 may perform one or more tasks described as being performed by one or more other functional components of cloud device 150.

Figure 5:
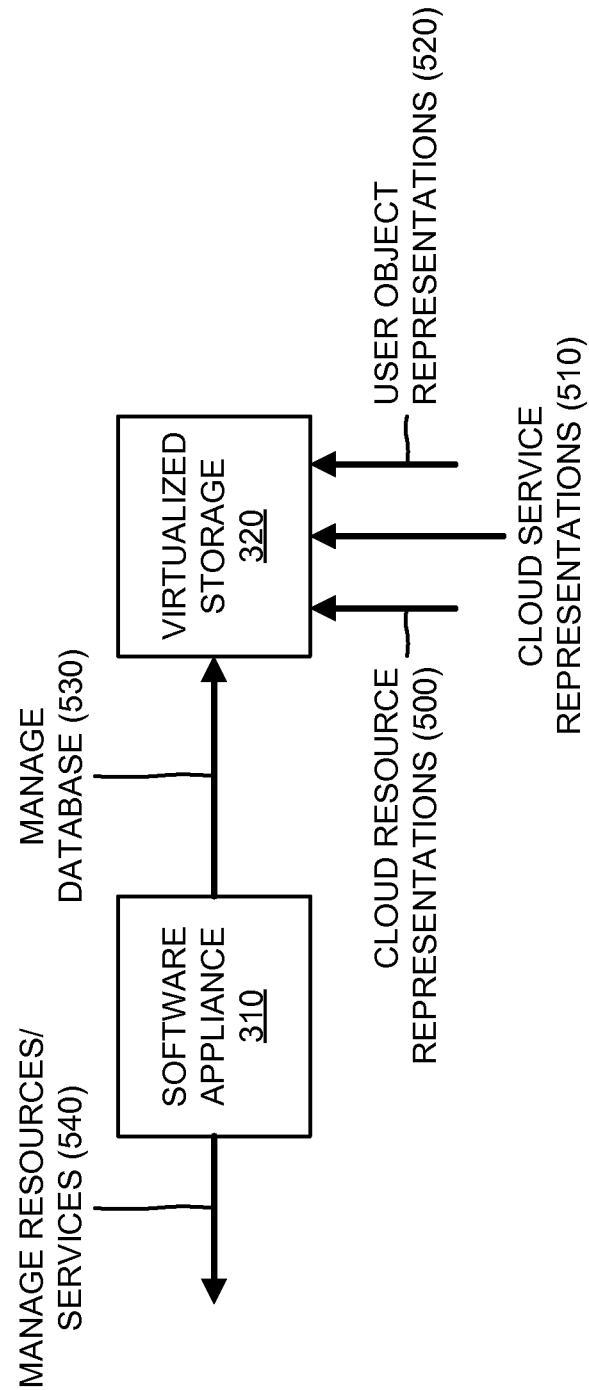
FIG. 5 is a diagram of example operations capable of being performed by functional components of the data center device.

FIG. 5 is a diagram of example operations capable of being performed by functional components of data center device 120. As shown, data center device 120 may include software appliance 310 and virtualized storage 320. Data center device 120, software appliance 310 and virtualized storage 320 may include the features described above in connection with, for example, one or more of FIGS. 1-3.

As further shown in FIG. 5, virtualized storage 320 may receive and store representations of cloud resources, services, and user objects utilized by data center device 120. In one example, virtualized storage 320 may receive representations of cloud resources, services, and/or user objects, such as cloud resource representations 500, cloud service representations 510, and user object representations 520. Virtualized storage 500 may store the representations of cloud resources, services, and/or user objects in a data structure (e.g., a database, a table, a tree, or another arrangement of data).

Cloud resource representations 500 may include database objects, such as a cloud node, a cloud volume, etc. A cloud node may include a representation of a compute instance executing in cloud device 150 (e.g., an AMAZON Elastic Cloud Compute (EC2) instance, a TERREMARK VM, etc.) on behalf of data center device 120. A cloud volume may include a representation of a storage resource of cloud device 150 (e.g., an AMAZON Elastic Block Store (EBS) volume) that may be utilized by data center device 120.

Cloud service representations 510 may include database objects, such as a virtualization, a cloud tunnel, a data transfer, etc. A virtualization may include a representation of a virtual machine (VM) that is executing on behalf of data center device 120. A cloud tunnel may include a representation of a virtual tunnel between data center device 120 and cloud device 150. The cloud tunnel may depend on one or more cloud nodes being active. A data transfer may include a representation of a data transfer operation between data center device 120 and cloud device 150. The data transfer may depend on cloud nodes, cloud volumes, and servers (e.g., described below). In one example, cloud service representations 510 may depend on one or more cloud resource representations 500.

User object representations 520 may include database objects, such as a server. A server may include a representation of a virtual machine managed by software appliance 310. Depending on an action that software appliance 310 is performing on a server (e.g., moving to cloud computing environment 140, starting in cloud computing environment 140, etc.), the server may depend on cloud tunnels (e.g., for tunneling) and/or cloud nodes (e.g., for executing cloud isolation technology, a data transfer, etc.). In one example, user object representations 520 may depend on one or more cloud service representations 510.

Cloud resource representations 500, cloud service representations 510, and user object representations 520, and their dependencies, may be maintained in, for example, a database provided in virtualized storage 320. Software appliance 310 may manage the database, as indicated by reference number 530. For example, software appliance 310 may include a background process that monitors cloud resource representations 500, cloud service representations 510, and user object representations 520, and their dependencies. If one of cloud resource representations 500, cloud service representations 510, or user object representations 520 is not referenced by another database object in the database, the unreferenced object may be eligible for being reaped (i.e., deleted or removed) from the database.

As further shown in FIG. 5, software appliance 310 may manage cloud resources and/or services provided by cloud computing environments 140 (not shown in FIG. 5), as indicated by reference number 540. For example, if software appliance 310 determines that a particular cloud resource representation 500 is not referenced by another database object in the database, software appliance 310 may stop a particular cloud resource represented by the particular cloud resource representation 500. In another example, if software appliance 310 determines that a particular cloud service representation 510 is not referenced by another database object in the database, software appliance 310 may stop a particular cloud service represented by the particular cloud service representation 510.

Although FIG. 5 shows example operations capable of being performed by functional components of data center device 120, in other implementations, data center device 120 may include fewer functional components, different functional components, differently arranged functional components, or additional functional components than depicted in FIG. 5. Additionally, or alternatively, one or more functional components of data center device 120 may perform one or more tasks described as being performed by one or more other functional components of data center device 120.

FIG. 6 is a diagram of a portion 600 of an example database capable of being provided in and/or managed by data center device 120 (e.g., in virtualized storage 320). As illustrated, database portion 600 may include a variety of information associated with representations of cloud resources, services, and/or user objects. For example, database portion 600 may include an object field 610, a dependency field 620, and/or a variety of entries 630-680 associated with fields 610 and 620.

Object field 610 may include database objects that are representations of cloud resources, services, and/or user objects managed by data center device 120. For example, object field 610 may include cloud resource representations 500, such as a first cloud node object (N1) in entry 630, and a second cloud node object (N2) in entry 640. The cloud node objects may include representations of compute instances executing in cloud device 150 on behalf of data center device 120.

Alternatively, or additionally, object field 610 may include cloud service representations 510, such as a data transfer object (DT1) in entry 650 and a cloud tunnel object (CT1) in entry 660. The data transfer object may include a representation of a data transfer operation between data center device 120 and cloud device 150. The cloud tunnel object may include a representation of a virtual tunnel between data center device 120 and cloud device 150.

Alternatively, or additionally, object field 610 may include user object representations 520, such as a server object (S1) in entry 670. The server object may include a representation of a virtual machine managed by software appliance 310.

Dependency field 620 may include dependencies of the objects identified in object field 610. Each entry in object field 610 may include an explicit dependency on zero or more other objects in database portion 600 (e.g., which may be implemented using foreign key constraints). As shown in FIG. 6, the cloud node objects (N1 and N2) may not have dependencies. The data transfer object (DT1) may depend on one the first cloud node object (N1). The cloud tunnel object (CT1) may depend on the first cloud node object (N1) and the second cloud node object (N2). The server object (S1) may depend on the data transfer object (DT1) and the cloud tunnel object (CT1). In one example implementation, software appliance 310 may utilize the information provided in dependency field 620 as a guide to determining when and/or what to delete from database portion 600.

Although FIG. 6 shows example information that may be provided in database portion 600, in other implementations, database portion 600 may contain less information, different information, differently arranged information, and/or additional information than depicted in FIG. 6.

Figure 7:
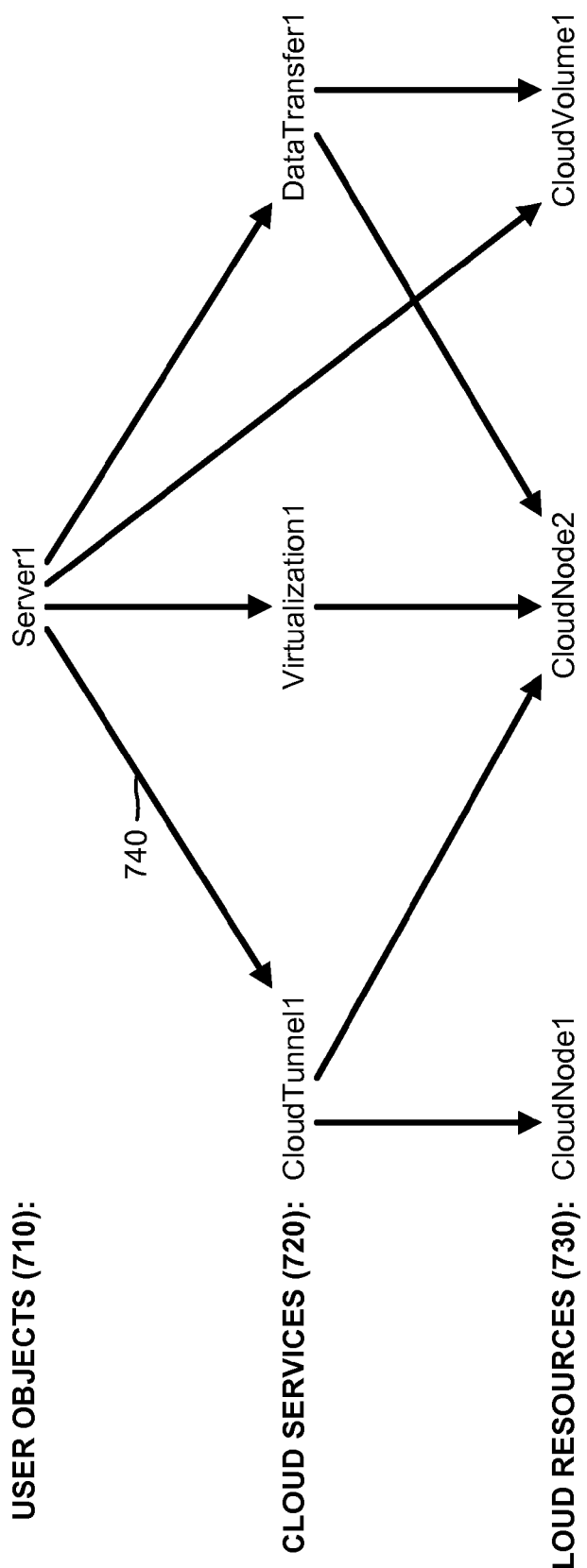
FIG. 7 is a diagram of example dependencies provided between objects maintained in the database portion of FIG. 6.

FIG. 7 is a diagram of example dependencies 700 provided between objects maintained in database portion 600 (FIG. 6). As shown in FIG. 7, dependencies 700 may include dependencies provided between user objects 710, cloud services 720, and cloud resources 730.

User objects 710 may correspond to user object representations 520 (FIGS. 5 and 6) and may be provided as a top layer of dependencies 700. User objects 710 may include, for example, a first server (Server1).

Cloud services 720 may correspond to cloud service representations 510 (FIGS. 5 and 6) and may be provided as a middle layer of dependencies 700. Cloud services 720 may include, for example, a first cloud tunnel (CloudTunnel1), a first virtualization (Virtualization1), and a first data transfer (DataTransfer1).

Cloud resources 730 may correspond to cloud resource representations 500 (FIGS. 5 and 6) and may be provided as a bottom layer of dependencies 700. Cloud resources 730 may include, for example, a first cloud node (CloudNode1), a second cloud node (CloudNode2), and a first cloud volume (CloudVolume1).

As further shown in FIG. 7, a number of arrows 740 may indicate dependencies 700 among user objects 710, cloud services 720, and cloud resources 730. For example, the first server (Server1) may depend on the first cloud tunnel (CloudTunnel1), the first virtualization (Virtualization1), and the first data transfer (DataTransfer1). The first cloud tunnel (CloudTunnel1) may depend on the first cloud node (CloudNode1) and the second cloud node (CloudNode2). The first virtualization (Virtualization1) may depend on the second cloud node (CloudNode2). The first data transfer (DataTransfer1) may depend on the second cloud node (CloudNode2) and the first cloud volume (CloudVolume1).

In one example implementation, if any of arrows 740 point to one of cloud services 720 or cloud resources 730, the pointed to cloud service 720/cloud resource 730 may not be eligible for being reaped. FIG. 7 may depict one possible configuration of dependencies 700. However, dependencies 700 may constantly change depending on the states of user objects 710, cloud services 720, and cloud resources 730, and depending on operations currently being performed by data center device 120. Although FIG. 7 shows example user objects 710/cloud services 720/cloud resources 730, in other implementations, different user objects 710/cloud services 720/cloud resources 730, differently arranged user objects 710/cloud services 720/cloud resources 730, and/or additional user objects 710/cloud services 720/cloud resources 730, than depicted in FIG. 7, may be provided.

Figure 8:
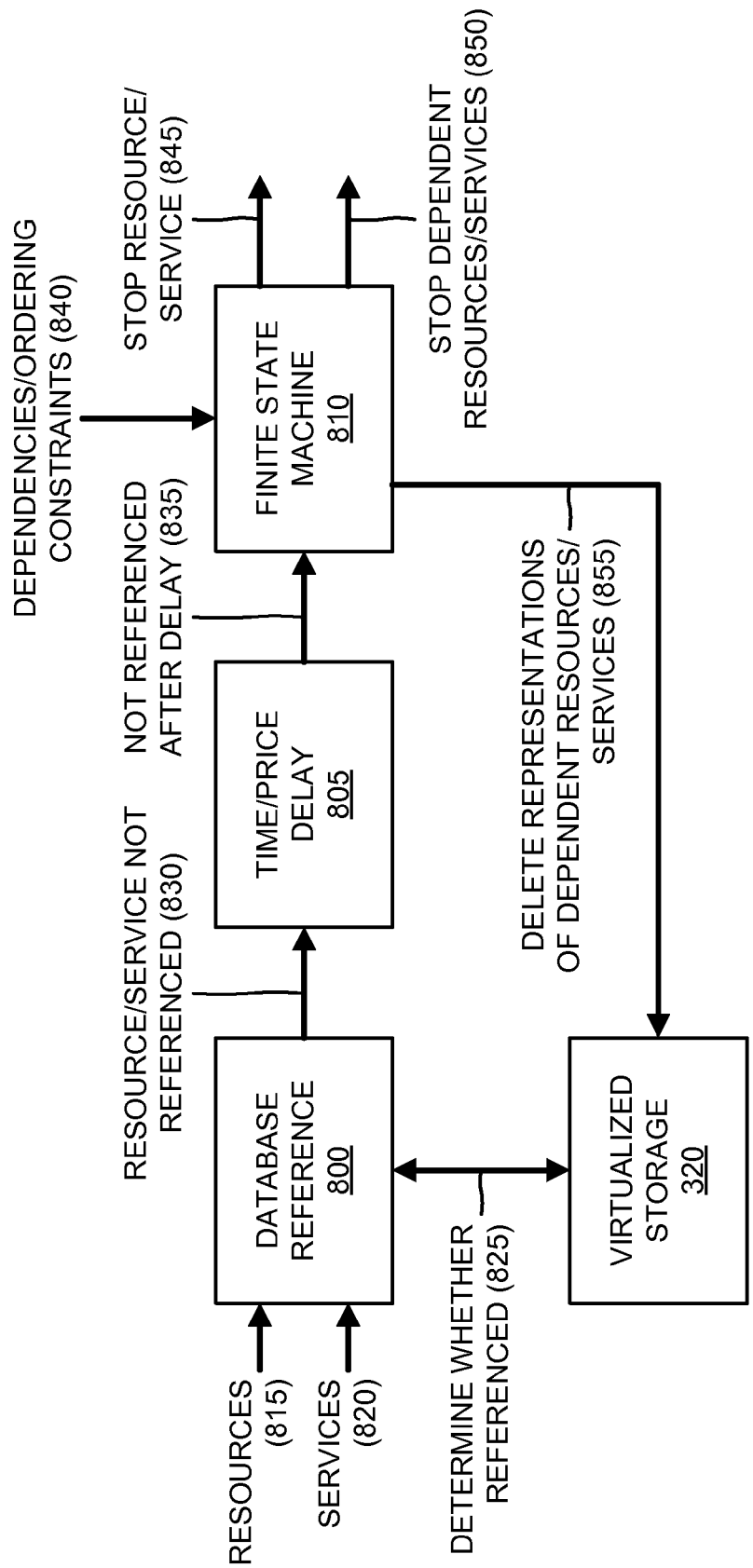
FIG. 8 is a diagram of further example operations capable of being performed by functional components of the data center device.

FIG. 8 is a diagram of further example operations capable of being performed by functional components of data center device 120. As shown, data center device 120 may include virtualized storage 320, a database reference component 800, a time/price delay component 805, and a finite state machine 810. Data center device 120 and virtualized storage 320 may include the features described above in connection with, for example, one or more of FIGS. 1-3 and 5-7.

Database reference component 800 may receive information 815 associated with cloud resources utilized by data center device 120, and may receive information 820 associated with cloud services utilized by data center device 120. Database reference component 800 may determine whether one or more cloud resources identified in information 815 are referenced in the database provided in virtualized storage 320, as indicated by reference number 825. Alternatively, or additionally, database reference component 800 may determine whether one or more cloud services identified in information 820 are referenced in the database provided in virtualized storage 320, as further indicated by reference number 825. If database reference component 800 determines that a cloud resource or service is referenced in the database provided in virtualized storage 320, database reference component 800 may stop reaping associated with the cloud resource or service. If database reference component 800 determines that a cloud resource or service is not referenced in the database provided in virtualized storage 320, database reference component 800 may provide, to time/price delay component 805, an indication 830 that the cloud resource/service is not referenced.

Time/price delay component 805 may receive indication 830, and may begin a delay timer based on time and/or price characteristics associated with the unreferenced cloud resource/service. In one example implementation, providers of cloud computing environments 140 may utilize different billing characteristics regarding how the providers charge customers (e.g., data center device 120). For example, a provider of cloud computing environment 140 may charge a customer for compute instances for a discrete hour of time. In other words, the customer may pay the provider for an hour of compute instances regardless of whether the customer utilizes the compute instances for one second or for fifty-nine (59) minutes and fifty-nine (59) seconds. In another example, a provider of cloud computing environment 140 may charge a customer for storage by the month, regardless of whether the customer utilizes the storage for one second or for one month.

Furthermore, because time/price delay component 805 may know the billing characteristics of each provider of cloud computing environments 140, time/price delay component 805 may keep cloud resources around as long as possible before paying for additional time for the cloud resources. For example, data center device 120 may start a particular cloud device 150 for transferring data, and may use the particular cloud device 150 for a few minutes. If the provider of the particular cloud device 150 charges by the hour, time/price delay component 805 may set the timer to a nearest whole hour (e.g., less an expected time it takes to shutdown the particular cloud device 150) so that data center device 120 may utilize the particular cloud device 150 for the full hour paid for the particular cloud device 150.

If the delay timer has not expired, time/price delay component 805 may determine whether the unreferenced cloud resource/service is referenced in the database provided in virtualized storage 320. If the unreferenced cloud resource/service is referenced in the database prior to the expiration of the delay timer, time/price delay component 805 may stop the reaping of the database for the cloud resource/service. If the unreferenced cloud resource/service is not referenced in the database after the expiration of the delay timer, time/price delay component 805 may provide, to finite state machine 810, an indication 835 that the cloud resource/service is not referenced in the database after the expiration of the delay timer.

Finite state machine 810 may receive indication 835 from time/price delay component 805, and may receive dependencies/ordering constraints 840 associated with the unreferenced cloud resource/service. Dependencies/ordering constraints 840 may include dependencies and/or ordering constraints associated with cloud resources and cloud services utilized by data center device 120. For example, a server may depend on a cloud tunnel and the cloud tunnel may depend on two cloud nodes. If the server no longer needs the cloud tunnel, data center device 120 may, based on dependencies/ordering constraints 840, stop the cloud tunnel before stopping the two cloud nodes. Thus, dependencies/ordering constraints 840 may ensure that cloud resource/services are stopped in a correct order.

In one example implementation, based on indication 835 and/or dependencies/ordering constraints 840, finite state machine 810 may stop the unreferenced cloud resource/ service, as indicated by reference number 845. After stopping the unreferenced cloud resource/service, finite state machine 810 may stop cloud resources/services that are dependent on the unreferenced cloud resource/service, as indicated by reference number 850. Finite state machine 810 may also delete, from the database provided in virtualized storage 320, representations of the cloud resources/services that are dependent on the unreferenced cloud resource/service, as indicated by reference number 855.

As described above, the cloud resources/services utilized by data center device 120 may be represented as objects in the database of virtualized storage 320. Finite state machine 810 may place a database object in a particular state so that the database object may be deleted. Alternatively, or additionally, finite state machine 810 may place a database object in another particular state so that the database object may be utilized. Finite state machine 810 may transition a database object to a different state based on the database object's current state and a request to transition to the different state. For example, a cloud node may begin in a STOPPED state and finite state machine 810 may transition the cloud node to a STARTED state when the cloud node is eligible to be started. Finite state machine 810 may handle error cases and/or retries due to transient issues, such as, for example, network timeouts that occur when communicating with cloud computing environment 140.

In one example, a server may depend on a cloud tunnel and the cloud tunnel may depend on two cloud nodes. If the server no longer needs the cloud tunnel and no other servers are using the same cloud tunnel, finite state machine 810 may invoke a stop action for the cloud tunnel, which may eventually transition the cloud tunnel to a STOPPED state. Invoking the stop action for the cloud tunnel may take a short time period (e.g., minutes) or a longer time period (e.g., hours) depending on network conditions. For example, if there are network problems, finite state machine 810 may continue to retry the stop action for the cloud tunnel until the stop action is successful. After the cloud tunnel is stopped, finite state machine 810 may delete the representation of the cloud tunnel from the database provided in virtualized storage 320. After the representation of the cloud tunnel is deleted from the database, finite state machine 810 may begin reaping the cloud nodes.

For example, finite state machine 810 may invoke stop actions for the cloud nodes, which may eventually transition the cloud nodes to STOPPED states. Invoking the stop actions for the cloud nodes may take a short time period (e.g., minutes) or a longer time period (e.g., hours) depending on network conditions. After the cloud nodes are stopped, finite state machine 810 may delete the representations of the cloud nodes from the database. After the representations of the cloud nodes are deleted from the database, finite state machine 810 may begin reaping the server. For example, finite state machine 810 may invoke a stop action for the server, which may eventually transition the server to a STOPPED state. Invoking the stop action for the server may take a short time period (e.g., minutes) or a longer time period (e.g., hours) depending on network conditions. After the server is stopped, finite state machine 810 may delete the representation of the server from the database.

Although FIG. 8 shows example operations capable of being performed by functional components of data center device 120, in other implementations, data center device 120 may include fewer functional components, different functional components, differently arranged functional components, or additional functional components than depicted in FIG. 8. Additionally, or alternatively, one or more functional components of data center device 120 may perform one or more tasks described as being performed by one or more other functional components of data center device 120.

FIG. 9 is a flow chart of an example process 900 for managing cloud resource lifecycles in a multi-cloud computing environment according to an implementation described herein. In one implementation, process 900 may be performed by data center device 120. Alternatively, or additionally, some or all of process 900 may be performed by another device or group of devices, including or excluding data center device 120.

As shown in FIG. 9, process 900 may include receiving information associated with a resource/service provided by a cloud computing environment (block 910), and determining whether a representation of the resource/service is referenced in a database (block 920). For example, in an implementation described above in connection with FIG. 8, database reference component 800 may receive information 815 associated with cloud resources utilized by data center device 120, and may receive information 820 associated with cloud services utilized by data center device 120. Database reference component 800 may determine whether one or more cloud resources identified in information 815 are referenced in a database provided in virtualized storage 320, as indicated by reference number 825. Alternatively, or additionally, database reference component 800 may determine whether one or more cloud services identified in information 820 are referenced in the database provided in virtualized storage 320, as further indicated by reference number 825.

As further shown in FIG. 9, if the representation of the resource/service is referenced in the database (block 920—YES), process 900 may include stopping the reaping of the resource/service (block 930). If the representation of the resource/service is not referenced in the database (block 920—NO), process 900 may include beginning a timer based on time/price characteristics associated with the resource/service (block 940). For example, in an implementation described above in connection with FIG. 8, if database reference component 800 determines that a cloud resource or service is referenced in the database provided in virtualized storage 320, database reference component 800 may stop reaping associated with the cloud resource or service. If database reference component 800 determines that a cloud resource or service is not referenced in the database provided in virtualized storage 320, database reference component 800 may provide, to time/price delay component 805, indication 830 that the cloud resource/service is not referenced. Time/price delay component 805 may receive indication 830, and may begin a delay timer based on time and/or price characteristics associated with the unreferenced cloud resource/service.

Returning to FIG. 9, process 900 may include determining whether the timer has expired (block 950). If the timer has not expired (block 950—NO), process 900 may include determining whether a representation of the resource/service is referenced in the database (block 920) and returning to process block 950 when the representation is not referenced in the database (block 820—NO). If the timer has expired (block 950—YES), process 900 may include stopping the resource/service and resources/services dependent on the resource/service (block 960). For example, in an implementation described above in connection with FIG. 8, if the delay timer has not expired, time/price delay component 805 may determine whether the unreferenced cloud resource/service is referenced in the database provided in virtualized storage 320. If the unreferenced cloud resource/service is referenced in the database prior to the expiration of the delay timer, time/price delay component 805 may stop the reaping of the database for the cloud resource/service. If the unreferenced cloud resource/service is not referenced in the database after the expiration of the delay timer, time/price delay component 805 may provide, to finite state machine 810, indication 835 that the cloud resource/service is not referenced in the database after the expiration of the delay timer. Finite state machine 810 may receive indication 835 from time/price delay component 805, and may receive dependencies/ordering constraints 840 associated with the unreferenced cloud resource/service. Based on indication 835 and/or dependencies/ordering constraints 840, finite state machine 810 may stop the unreferenced cloud resource/service, as indicated by reference number 845.

As further shown in FIG. 9, process 900 may include deleting representations of the dependent resources/services from the database (block 970). For example, in an implementation described above in connection with FIG. 9, finite state machine 810 may delete, from the database provided in virtualized storage 320, representations of the cloud resources/services that are dependent on the unreferenced cloud resource/service, as indicated by reference number 855.

Systems and/or methods described herein may enable a data center device to manage cloud resource lifecycles in a multi-cloud computing environment. In one example implementation, the data center device may utilize a software appliance to stop unused and/or underutilized cloud resources, cloud services, and/or cloud user objects. Such an arrangement may enable the data center device from incurring unnecessary costs associated with unused and/or underutilized cloud resources, services, and/or user objects. While keeping costs to a minimum, the data center device may also keep cloud resources, services, and/or user objects available whenever possible.

The foregoing description of implementations provides illustration and description, but is not intended to be exhaustive or to limit the implementations to the precise form disclosed. Modifications and variations are possible in light of the above disclosure or may be acquired from practice of the implementations.

For example, while a series of blocks has been described with regard to FIG. 9, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   transmitting, by a first device and to a second device, a request for a resource provided by the second device,
      the first device being different than the second device, and
      the second device being associated with a cloud computing environment;
   receiving, by the first device and from the second device, information associated with the resource, provided by the second device, based on transmitting the request;
   accessing, by the first device and based on receiving the information associated with the resource provided by the second device, a data structure stored by the first device;
   determining, by the first device, whether a representation of the resource, provided by the second device, is referenced in the data structure,
      the representation of the resource, provided by the second device, being referenced based on the data structure indicating that at least one other resource utilizes the resource provided by the second device,
      the data structure storing information, identifying the at least one other resource, in association with information, identifying the resource provided by the second device, to indicate that the at least one other resource utilizes the resource provided by the second device;
   beginning, by the first device and based on the representation of the resource, provided by the second device, not being referenced in the data structure, a timer based on characteristics associated with the resource provided by the second device;
   using, by the first device and based on beginning the timer, the resource provided by the second device;
   stopping, by the first device and based on the timer having expired, use of the resource, provided by the second device, and use of one or more dependent resources,
      the one or more dependent resources being:
         dependent on the resource, and
         provided by the cloud computing environment; and
   deleting, by the first device, one or more representations, of the one or more dependent resources, from the data structure after stopping the use of the resource, provided by the second device, and after stopping the use of the one or more dependent resources.

2. The method of claim 1, further comprising:
   stopping a deleting or removing of the resource from the data structure based on the representation of the resource, provided by the second device, being referenced in the data structure.

3. The method of claim 1, further comprising:
   re-determining whether the representation of the resource, provided by the second device, is referenced in the data structure before the timer expires.

4. The method of claim 1, where the information associated with the resource, provided by the second device, includes information associated with at least one of:
   a cloud resource provided by the cloud computing environment to the first device, a cloud service provided by the cloud computing environment to the first device, or a cloud user object provided by the cloud computing environment to the first device.

5. The method of claim 4, where the cloud resource includes at least one of:
   a compute instance executing in the cloud computing environment on behalf of the first device,
   a storage resource, of the cloud computing environment, that is utilized by the first device, or
   a data transfer operation between the first device and the cloud computing environment.

6. The method of claim 4, where the cloud service includes at least one of:
   a virtual machine (VM) executing on behalf of the first device, or
   a virtual tunnel provided between the first device and the cloud computing environment.

7. The method of claim 4, where the cloud user object includes a virtual machine managed by the first device.

8. A first device comprising:
   a memory to store a data structure; and
   a processor to:
      transmit, to a second device, a request for a resource provided by the second device,
         the first device being different than the second device, and
         the second device being associated with a cloud computing environment;
      receive, from the second device and based on transmitting the request, information associated with the resource provided by the second device;
      access, based on receiving the information associated with the resource provided by the second device, the data structure stored by the first device;
      determine whether a representation of the resource, provided by the second device, is referenced in the data structure,
         the representation of the resource, provided by the second device, being referenced based on the data structure indicating that at least one other resource, provided by the cloud computing environment, utilizes the resource provided by the second device,
         the data structure storing information, identifying the at least one other resource, in association with information, identifying the resource provided by the second device, to indicate that the at least one other resource utilizes the resource provided by the second device;
      stop removal of the representation of the resource, provided by the second device, from the data structure based on the representation of the resource, provided by the second device, being referenced in the data structure;
      start a timer based on characteristics associated with the resource, provided by the second device, based on the representation of the resource, provided by the second device, not being referenced in the data structure;
      use, based on starting the timer, the resource provided by the second device;
      stop, based on the timer having expired, use of the resource provided by the second device and use of at least one dependent resource,
         the at least one dependent resource being dependent on the resource provided by the second device;
      remove, from the data structure, the representation of the resource, provided by the second device, after stopping the use of the resource provided by the second device; and
      remove, from the data structure, a representation of the at least one dependent resource after stopping the use of the at least one dependent resource.

9. The first device of claim 8, where the processor is further to:
   determine whether the representation of the resource, provided by the second device, is referenced in the data structure before the timer expires.

10. The first device of claim 8, where the information associated with the resource, provided by the second device, includes information associated with at least one of:
    a cloud resource provided by the cloud computing environment to the first device,
    a cloud service provided by the cloud computing environment to the first device, or
    a cloud user object provided by the cloud computing environment to the first device.

11. The first device of claim 10, where the cloud resource includes at least one of:
    a compute instance executing in the cloud computing environment on behalf of the first device,
    a storage resource, of the cloud computing environment, that is utilized by the first device, or
    a data transfer operation between the first device and the cloud computing environment.

12. The first device of claim 10, where the cloud service includes at least one of one of:
    a virtual machine (VM) executing on behalf of the first device, or
    a virtual tunnel provided between the first device and the cloud computing environment.

13. The first device of claim 10, where the cloud user object includes a virtual machine managed by the first device.

14. A non-transitory computer-readable medium storing instructions, the instructions comprising:
    one or more instructions which, when executed by a processor of a first device, cause the processor to:
       transmit, to a second device, a request for a resource provided by the second device,
          the first device being different than the second device, and
          the second device being associated with a cloud computing environment;
       receive, from the second device and based on transmitting the request, information associated with the resource provided by the second device;
       access, based on receiving the information associated with the resource provided by the second device, a data structure stored by the first device;
       determine whether a representation of the resource, provided by the second device, is referenced in the data structure,
          the representation of the resource, provided by the second device, being referenced based on at least one other resource, provided by the cloud computing environment, utilizing the resource provided by the second device,
          the data structure storing information, identifying the at least one other resource, in association with information, identifying the resource provided by the second device, to indicate that the at least one other resource utilizes the resource provided by the second device;

initiate a delay timer based on the representation of the resource, provided by the second device, not being referenced in the data structure;

use the resource provided by the second device;

stop, based on the delay timer having expired, use of the resource, provided by the second device, and use of at least one dependent resource, the at least one dependent resource being dependent on the resource provided by the second device; and delete, from the data structure, a representation of the at least one dependent resource after stopping the use of at least one dependent resource.

15. The non-transitory computer-readable medium of claim 14, where the one or more instructions that, when executed by the processor of the first device, further cause the processor to:

stop a deleting or removing of the resource, provided by the second device, from the data structure based on the representation of the resource, provided by the second device, being referenced in the data structure.

16. The non-transitory computer-readable medium of claim 14, where the one or more instructions that, when executed by the processor of the first device, further cause the processor to:

re-determine whether the representation of the resource, provided by the second device, is referenced in the data structure before the delay timer expires.

17. The non-transitory computer-readable medium of claim 14, where the information associated with the resource, provided by the second device, includes information associated with at least one of:

a cloud resource provided by the cloud computing environment to the first device, a cloud service provided by the cloud computing environment to the first device, or a cloud user object provided by the cloud computing environment to the first device.

18. The non-transitory computer-readable medium of claim 17, where the cloud resource includes at least one of:

a compute instance executing in the cloud computing environment on behalf of the first device, a storage resource, of the cloud computing environment, that is utilized by the first device, or a data transfer operation between the first device and the cloud computing environment.

19. The non-transitory computer-readable medium of claim 17, where the cloud service includes at least one of:

a virtual machine (VM) executing on behalf of the first device, or a virtual tunnel provided between the first device and the cloud computing environment.

20. The non-transitory computer-readable medium of claim 17, where the cloud user object includes a virtual machine managed by the first device.

* * * * *